United States Patent [19]
Krauch et al.

[11] 3,919,045
[45] Nov. 11, 1975

[54] PROCESS FOR OBTAINING CHOLESTEROL

[75] Inventors: Carl H. Krauch, Neuss; Frank Hill, Dusseldorf; Rudolf Lehmann, Neuss; Hans Pfeiffer, Hann, Rhineland; Joachim Schindler, Dusseldorf-Benrath, all of Germany

[73] Assignee: Henkel & Cie G.m.b.H., Dusseldorf, Germany

[22] Filed: Feb. 10, 1975

[21] Appl. No.: 548,354

[30] Foreign Application Priority Data
Feb. 23, 1974 Germany.......................... 2408752

[52] U.S. Cl............................................ 195/3; 195/2
[51] Int. Cl.[2]....................................... C12D 13/00
[58] Field of Search................. 195/2, 3 R, 3 H, 29

[56] References Cited
UNITED STATES PATENTS 2,316,621   4/1943   Renner.................................. 195/3 R
3,522,145   7/1970   Apostolatos et al.................. 195/2

*Primary Examiner*—Alvin E. Tanenholt
*Attorney, Agent, or Firm*—Hammond & Littell

[57] ABSTRACT

A process for the production of a fraction enriched in cholesterol and cholesterol esters from the residues of the processing of fats, in which the residues in emulsified form in an aqueous culture medium are broken down with a microorganism of the species *Nocardia paraffinica, Nocardia salmonicolor, Nocardia opaca, Candida lipolytica,* or *Corynebacterium petrophilum* at a temperature of 25° to 55°C and a pH value of 4.0 to 8.0, and the enriched sterols obtained are then separated from the culture solution by solvent extraction.

14 Claims, No Drawings

PROCESS FOR OBTAINING CHOLESTEROL

THE PRIOR ART

In the industry for the processing of fats, during the cleavage of fats and the subsequent fatty acid distillation, large quantities of previously mostly unused residues are obtained annually. These residues, especially when they are of animal origin, contain considerable amounts of cholesterol and cholesterol esters. Owing to the constantly increasing need for cholesterol for pharmaceutical purposes, the production of these sterols from the residues obtained in the processing of fats would appear to be of great value.

It is known that a number of micro-organisms are able to decompose fats and fatty acids. It has been found, however, that in many cases this decomposition is not effected with the speed necessary for practical application and that the growth of some of the micro-organisms is inhibited by the combustion and tar constituents or other oxidation and decomposition products present in considerable amounts in the residues.

OBJECTS OF THE INVENTION

It is an object of the present invention to provide a process for obtaining cholesterol microbiologically and more particularly to provide a process for preparing a fraction enriched in cholesterol or cholesterol esters from residues obtained in processing fat.

It is another object of the present invention to provide a process for the production of a fraction enriched in cholesterol and cholesterol esters from the residues of the processing of fats, in which the residues in emulsified form in an aqueous culture medium are broken down with a micro-organism of the species *Nocardia paraffinica*, *Nocardia salmonicolor*, *Nocardia opaca*, *Candida lipolytica*, or *Corynebacterium petrophilum* at a temperature of 25°C to 55°C and a pH value of 4.0 to 8.0, and the enriched sterols obtained are then separated from the culture solution by solvent extraction.

These and further objects of the present invention will become more apparent as the description thereof proceeds.

DESCRIPTION OF THE INVENTION

The present invention relates to a process for obtaining cholesterol microbiologically. More particularly the present invention provides a process for preparing a fraction enriched in cholesterol or cholesterol esters from residues obtained in the processing of fats. In other words the present invention provides suitable strains of micro-organisms which, by cultural methods, makes possible the production of a fraction enriched in cholesterol and cholesterol esters from the residues resulting from the working up and fractionation of fats.

According to the present invention there is provided a process for the production of a fraction enriched in cholesterol and cholesterol esters from the residues of the processing of fats, in which the residues in emulsified form in an aqueous cultural medium are broken down with a micro-organism of the species *Nocardia paraffinica*, *Nocardia salmonicolor*, *Nocardia opaca*, *Candida lipolytica*, or *Corynebacterium petrophilum* at a temperature of 25° to 55°C, preferably 27° to 39°C, and a pH value of 4.0 to 8.0, preferably 5.0 to 7.0, and the concentrated sterols are then separated from the culture solution by extraction with a solvent.

More particularly, the present invention is directed to a process for the preparation of a fraction enriched in cholesterol or cholesterol esters from the residues of the processing of fats comprising emulsifying said residues in an aqueous culture medium, culturing said emulsified residues with a micro-organism selected from the group consisting of the species *Nocardia paraffinica*, *Nocardia salmonicolor*, *Nocardia opaca*, *Candida lipolytica*, and *Corynebacterium petrophilum* at a temperature of 25°C to 55°C and a pH value of 4.0 to 8.0 for a time sufficient to product a fraction enriched in sterols, separating said enriched sterols fraction from said culture medium by solvent extraction, and recovering said cholesterol or cholesterol esters.

The said micro-organisms are marked by particular insensitivity towards the tarry constituents and other oxidation and decomposition products contained in the residues and, in addition to this, they have a high biological activity with respect to the residues being broken down.

The microbial decomposition is effected in an aqueous culture medium, which contains as a source of carbon either only the residue to be broken down or the residue to be broken down plus an additional metabolizable carbon compound, as well as, in addition, the nutrients and growth substances usually required by the micro-organisms.

Residues from the processing of fats of animal origin especially residues from the distillation of fatty acids, after cleavage of fats are mostly used for the process. These fatty residues consist essentially of fatty acids, fatty acid mono- and di-glycerides, polymeric products of fats and fatty acids, oxidation products of fats and fatty acids, and combustion products of fats and fatty acids, and tarry constituents. These fats, fatty acids and fatty residues are individual substances or mixtures thereof and generally are higher fatty substances.

In order to stimulate the micro-organism growth, it is advisable to provide an additional metabolizable source of carbon, for example, paraffins, glycerin, lower carboylic acids, starch, dextrin, sucrose, glucose, fructose, maltose and sugar-containing waste materials. Suitable sources of nitrogen or growth substances are ammonium salts, nitrates, urea, peptones, corn steep liquor, soya bean meal or cake, distiller's mash and fish meal. In addition, inorganic salts for example alkali metal of hydrogen phosphates such as sodium, potassium or ammonium hydrogen phosphate, or the alkaline earth metal salts such as calcium salt or magnesium salt, the manganese salt and the iron salts, as well as fermentation accelerators, such as yeast extracts, meat extracts and vitamins are suitably added to the nutrient medium.

The residues to be broken down are added to the nutrient medium in emulsified form in a concentration of about 1 to about 20 percent by weight, preferably 2 to 10 percent by weight. If the residue is used as the only source of carbon, this is added at the beginning of the culture process and, if necessary, is further continuously added during the period of micro-organism growth. It is also possible to cultivate the cultures first of all on the usual substrates, for example sugar-like substances or other carbon sources, so that the highest possible cell densities are obtained, and then to insert the residue to be decomposed, whereby higher concentrations may be obtained.

The emulsification of the fatty residues in the culture solution is carried out by means of known emulsifiers.

In particular, non-ionic emulsifiers, such as for example, fatty acid sorbitol esters and their adducts with 20 to 200 mols of ethylene oxide, preferably adducts with 20 to 80 mol of ethylene oxide.

Before starting the cultivation, the culture medium used is suitably sterilized by heating. The incubation temperature is from 25°C to 55°C, preferably 27°C to 39°C. The pH value of the nutrient solutions is 4.0 to 8.0, preferably 5.0 to 7.0. The culturing procedure is chiefly carried out under aerobic conditions by shaking or stirring and aerating, and generally requires a period of 1 to 5 days.

After the microbial decomposition of the fatty residues is finished, the whole culture solution is extracted with a lipophilic solvent, without the cells having to be previously separated. The extraction is preferably carried out in the culture vessel. Hydrocarbons such as saturated hydrocarbons having 4 to 10 carbon atoms for example hexane, cyclohexane, or benzine mixtures, or alcohols such as lower alkanols for example butanol or hexanol, or ketones such as lower alkanones for example methylisobutylketone, or ethers such as di-loweralkylethers for example diethylether, or chlorinated hydrocarbons such as chlorinated lower alkanols for example chloroform or other usual solvents are examples of suitable extraction agents.

After removal of the solvent, a residue enriched with cholesterol or cholesterol esters remains. This residue may either be further processed as such, or it may be worked up for the production of the pure sterols, for example by recrystallization or chromatography.

The following examples are merely illustrative of the present invention without being deemed limitative in any manner thereof.

EXAMPLE 1

Nocardia paraffinica ATCC 21198 was first cultivated at 30°C for 24 hours with shaking in a culture medium which contains 1.56% of special peptone, 0.28% of yeast extract, 0.56% of NaCl and 0.1% of D(+)-glucose and was adjusted to a pH value of 6.8. 10 ml of this starter culture were then injected into 100 ml of the main culture and incubated at 30°C in a 500 ml Erlenmeyer flask on a shaking machine. The composition of the nutrient medium of the main culture was as follows:

0.05% $NaH_2PO_4.2H_2O$, 0.18% $K_2HPO_4$, 0.06% $NH_4NO_3$, 0.06% $MgSO_4.7H_2O$, 0.02% $MnCl_2.4H_2O$, 0.01% $FeSO_4.7H_2O$, 0.01% $CaCl_2.2H_2O$, 0.50% corn steep liquor, 0.50%, soya meal, 0.05% Tween 80, 2% fatty acid distillation residues.

The pH value of the nutrient solution was adjusted to 6.5. The cultures were harvested after 72 hours incubation. The whole culture was extracted with chloroform. After distilling off the solvent, a faintly yellowish residue remained which consisted of 80 to 95 percent by weight of cholesterol ester.

Similar results were obtained when the decomposition was carried out with the species Nocardia salmonicolor ATCC 19149 or Nocardia opaca DSM 363 (German collection of micro-organisms, Inst.f.Mikrobiologie, Gottingen) or Candida lipolytica DSM.

EXAMPLE 2

Corynebacterium petrophilum ATCC 19080 was cultivated as a starter culture using a procedure analogous to that described in Example 1 and then injected into the main culture and was incubated at 37°C on the shaking machine. The composition of the main culture medium was as follows:

0.05% $NaH_2PO_4.2H_2O$, 0.18% $K_2HPO_4$, 0.06% $NH_4NO_3$, 0.06% $MgSO_4.7H_2O$, 0.02% $MnCl_2.4H_2O$, 0.01% $FeSO_4.7H_2O$, 0.01% $CaCl_2.2H_2O$, 0.80% corn steep liquor, 0.50% soya meal, 1.00% starch (broken down with amylase), 0.50% fatty acid distillation residues, and 0.07% Tween 80.

The pH value of the nutrient solution was 6.5. After 36 hours incubation, 10% of the fatty acid distillation residues were added; and the culture was harvested after a further 48 hours incubation.

The whole culture was extracted with methylisobutylketone. After drying and distilling off the solvent, an only faintly colored residue remained, and 50 to 70 percent of which consisted of cholesterol.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. A process for the preparation of a fraction enriched in cholesterol or cholesterol esters from the residues of the processing of fats comprising emulsifying said residues in an aqueous culture medium, culturing said emulsified residues with a micro-organism selected from the group consisting of the species Norcardia paraffinica, Nocardia salmonicolor, Nocardia opaca, Candida lipolytica, and Corynebacterium petrophilum at a temperature of 25°C to 55°C and a pH value of 4.0 to 8.0 for a time sufficient to produce the fraction enriched in sterols, separating said enriched sterols fraction from said culture medium by solvent extraction, and recovering said cholesterol or cholesterol esters.

2. The process of claim 1, wherein said residues are cultured at a temperature of 27°C to 39°C.

3. The process of claim 1, wherein said residues are cultured at a pH value of 5.0 to 7.0.

4. The process of claim 1, wherein said residues are used as the only source of carbon in said culture medium.

5. The process of claim 1, wherein said aqueous culture medium includes an additional source of carbon selected from the group consisting of paraffin, glycerin, lower carboxylic acids, starch, dextrin, sucrose, glucose, fructose, maltose, sugar-containing waste materials and the mixtures thereof.

6. The process of claim 1, wherein said culturing process is carried out under aerobic conditions.

7. The process of claim 1, wherein said emulsifying of said residues is carried out with an emulsifier selected from the group consisting of a fatty acid sorbitol ester and an adduct of a fatty acid sorbitol ester with 20 to 200 mols of ethylene oxide.

8. The process of claim 7, wherein said adduct is an adduct of a fatty acid sorbitol ester with 20 to 80 mols of ethylene oxide.

9. The process of claim 1, wherein said enriched sterols are separated by solvent extraction with an organic solvent selected from the group consisting of a hydrocarbon, an alcohol, a ketone, an ether and a chlorinated hydrocarbon.

10. The process of claim 9, wherein said organic solvent is selected from the group consisting of a saturated hydrocarbon having from 4 to 10 carbon atoms, a lower alkanol, a lower alkanone, a di-loweralkylether and a chlorinated loweralkane.

11. The process of claim 10, wherein said organic solvent is selected from the group consisting of benzine, chloroform and methylisobutylketone.

12. The process of claim 1, wherein said residues are present in the said culture medium in an amount of from about 1 to about 20 percent by weight.

13. The process of claim 12, wherein said residues are present in said culture medium in an amount of from 2 to 10 percent by weight.

14. The process of claim 1, wherein said residues of the processing of fats are derived from the processing of animal fats.

* * * * *